US012325653B2

(12) United States Patent
Elkins et al.

(10) Patent No.: US 12,325,653 B2
(45) Date of Patent: Jun. 10, 2025

(54) DAIRY WASTEWATER TREATMENT SYSTEM AND METHOD

(71) Applicant: Shamrock Foods Company, Phoenix, AZ (US)

(72) Inventors: Ronald Frank Elkins, Phoenix, AZ (US); Alexander James Rozanski, Phoenix, AZ (US); Kevin M. Walkinshaw, Phoenix, AZ (US); Joshua Handrick Moody, Phoenix, AZ (US)

(73) Assignee: Shamrock Foods Company

( * ) Notice: Subject to any disclaimer, the term of this patent is extended or adjusted under 35 U.S.C. 154(b) by 0 days.

(21) Appl. No.: 18/769,993

(22) Filed: Jul. 11, 2024

(65) Prior Publication Data

US 2024/0360019 A1    Oct. 31, 2024

Related U.S. Application Data

(63) Continuation of application No. 17/526,507, filed on Nov. 15, 2021, now abandoned.

(60) Provisional application No. 63/203,544, filed on Jul. 27, 2021.

(51) Int. Cl.
*C02F 9/00* (2023.01)
*C02F 1/24* (2023.01)
*C02F 1/52* (2023.01)
*C02F 1/66* (2023.01)
*C02F 103/32* (2006.01)

(52) U.S. Cl.
CPC ............... *C02F 9/00* (2013.01); *C02F 1/24* (2013.01); *C02F 1/52* (2013.01); *C02F 1/66* (2013.01); *C02F 2103/327* (2013.01); *C02F 2209/06* (2013.01); *C02F 2301/08* (2013.01)

(58) Field of Classification Search
None
See application file for complete search history.

(56) References Cited

U.S. PATENT DOCUMENTS

| | | | |
|---|---|---|---|
| 4,173,532 A | 11/1979 | Keoteklian | |
| 11,383,998 B1* | 7/2022 | Spani | ............ C02F 1/725 |
| 2002/0117456 A1 | 8/2002 | Krulik et al. | |
| 2004/0050796 A1 | 3/2004 | Coleman, Jr. | |
| 2005/0000908 A1 | 1/2005 | Karlsson et al. | |
| 2006/0289358 A1 | 12/2006 | Milchuck | |
| 2010/0224569 A1 | 9/2010 | Mitzlaff et al. | |
| 2016/0068417 A1 | 3/2016 | Buschmann | |

(Continued)

*Primary Examiner* — Peter Keyworth
(74) *Attorney, Agent, or Firm* — Polsinelli PC (57) ABSTRACT

A method of treating dairy wastewater includes receiving a dairy wastewater stream at a first pH from a dairy processing facility at an equalization tank, receiving the dairy wastewater stream from the equalization tank at a pump, and, based on at least one of the first pH or a second pH of the dairy wastewater stream upon exiting the equalization tank, receiving an acid to the dairy wastewater stream prior to the pump. A pump outlet stream includes a mixture of the dairy wastewater stream and the acid at a third pH that is lower than the first pH. The method also includes receiving the pump outlet stream at a pipe reactor in fluidic communication with the pump, then receiving the pipe reactor outlet stream at a dissolved air flotation (DAF) unit, and then outputting a liquid stream at a final pH from the DAF unit.

20 Claims, 2 Drawing Sheets

(56) References Cited

U.S. PATENT DOCUMENTS

2016/0355444 A1 12/2016 Olkowski et al.
2017/0297929 A1 10/2017 Whitaker et al.

* cited by examiner

DAIRY WASTEWATER TREATMENT SYSTEM AND METHOD

CROSS-REFERENCE TO RELATED APPLICATIONS

This application is a continuation of U.S. application Ser. No. 17/526,507, filed Nov. 15, 2021, which application claims the benefit of U.S. Provisional Application No. 63/203,544, filed Jul. 27, 2021. All the afore-mentioned applications are hereby incorporated by reference in their entireties into the present application.

FIELD OF THE DISCLOSURE

Aspects of the disclosure relate to systems and methods for treating dairy wastewater.

BACKGROUND OF THE DISCLOSURE

Dairy processing plants traditionally produce significant amounts of wastewater. Much of the wastewater is due to the production of contaminated water during the processing of dairy products. The wastewater must be treated to certain government standards before entering the publicly owned treatment works, hence the need for efficient and effective treatment systems and methods for dairy wastewater.

Additionally, dairy processing plants generally produce great fluctuations in wastewater quality and quantity, which poses challenges as each milk product may require a separate processing line. This may result in the change of dairy effluent composition with the start of a new cycle in the dairy manufacturing process, which impedes the work of in-factory wastewater treatment plants. Furthermore, intensive effluent volumetric variations in time are commonly observed.

Accordingly, there is an on-going need for improved systems and methods for treating dairy wastewater.

SUMMARY OF THE DISCLOSURE

Aspects of the disclosure relate to systems and methods for treating dairy wastewater. In accordance with a first aspect of the disclosure, provided is a system for treating dairy wastewater having an equalization tank configured to receive a dairy wastewater stream; a flash pump in fluidic communication with the equalization tank to receive the dairy wastewater stream, wherein the dairy wastewater stream includes dairy wastewater and an acid; and a pipe reactor in fluidic communication with the flash pump and configured to receive the pump outlet stream. The pipe reactor is fluidically coupled to a cationic coagulant feed stream conduit to receive a cationic coagulant feed stream and fluidically coupled to a flocculation feed stream conduit to receive the flocculation feed stream. The system also includes a dissolved air flotation unit configured to produce a liquid stream by separating coagulated and/or flocculated materials from a pipe reactor outlet stream.

Aspects of the present disclosure include a system for treating dairy wastewater. The system includes an equalization tank, a flash pump, a pipe reactor, and a dissolved air flotation unit. The equalization tank is configured to receive a dairy wastewater stream. The flash pump is in fluidic communication with the equalization tank to receive the dairy wastewater stream and an acid. A pump outlet stream includes the dairy wastewater stream and the acid. The pipe reactor is in fluidic communication with the flash pump and configured to receive the pump outlet stream. The pipe reactor is fluidically coupled to a cationic coagulant feed stream conduit to receive a cationic coagulant feed stream and fluidically coupled to a first flocculation feed stream conduit to receive a first portion of a flocculation feed stream. A pipe reactor outlet stream includes the pump outlet stream, the cationic coagulant feed stream, and the first flocculation feed stream. The dissolved air flotation unit is configured to produce a liquid stream by separating coagulated and/or flocculated materials from the pipe reactor outlet stream.

In certain instances, the acid is added to the dairy wastewater stream downstream of the equalization tank.

In certain instances, the acid is added to the dairy wastewater stream via a first acid stream and a second acid stream between the equalization tank and the flash pump.

In certain instances, the first acid stream and the second acid stream are configured to deliver the acid into the dairy wastewater stream in succession without any substances delivered into the dairy wastewater stream therebetween.

In certain instances, the system further includes a first pH meter positioned in the equalization tank, a second pH meter positioned between the equalization tank and the flash pump, a third pH meter positioned after the pipe reactor, and a fourth pH meter after the dissolved air flotation unit.

In certain instances, the second pH meter is positioned downstream of an acid inflow.

In certain instances, the pipe reactor is fluidically coupled to a first caustic feed stream conduit to receive a first portion of a caustic feed stream, wherein the pipe reactor outlet stream further includes the first portion of the caustic feed stream.

In certain instances, the dissolved air flotation unit is configured to receive a second flocculation feed stream conduit to receive a second portion of the flocculation feed stream.

In certain instances, the liquid stream is configured to exit the dissolved air flotation unit via an exit conduit, the exit conduit fluidically coupled to a first acid feed stream conduit and a second caustic feed stream conduit to receive a first portion of the acid and a second portion of the caustic feed stream, respectively.

In certain instances, the exit conduit is further fluidically coupled to a second acid feed stream conduit and a third caustic feed stream conduit to receive a second portion of the acid and a third portion of the caustic feed stream, respectively, and wherein a first pH meter is positioned downstream the first acid stream conduit and the second caustic feed stream conduit, the first pH meter positioned upstream of the second acid feed stream conduit and the third caustic feed stream conduit.

In certain instances, the system further includes a second pH meter positioned downstream of the second acid feed stream conduit and the third caustic feed stream conduit to measure the pH of the liquid stream in the exit conduit.

In certain instances, the flocculation feed stream includes an anionic flocculant.

Aspects of the present disclosure include a system for treating dairy wastewater. The system includes a first equalization tank configured to receive a dairy wastewater stream, a first acid feed stream conduit fluidically coupled to the first equalization tank and configured to deliver a first portion of an acid feed stream into the first equalization tank, a first caustic feed stream conduit fluidically coupled to the first equalization tank and configured to deliver a first portion of a caustic feed stream into the first equalization tank, and a second equalization tank fluidically coupled to the first equalization tank and configured to receive a first equalization tank outlet stream including the dairy wastewater stream, the first portion of the acid feed stream, and the first portion of the caustic feed stream. The system further includes a second acid feed stream conduit fluidically coupled to the second equalization tank and configured to deliver a second portion of the acid feed stream into the second equalization tank. The system further includes a second caustic feed stream conduit fluidically coupled to the second equalization tank and configured to deliver a second portion of the caustic feed stream into the second equalization tank. The system further includes a flash pump in fluidic communication with the equalization tank to receive a second equalization tank outlet stream including the first equalization tank outlet stream, the second portion of the acid feed stream, and the second portion of the caustic feed stream. The flash pump is fluidically coupled to a pump outlet conduit to receive a pump outlet stream including the second equalization tank outlet stream. The system further includes a third acid feed stream conduit fluidically coupled to the pump outlet conduit and configured to deliver a third portion of the acid feed stream therein. The system further includes a pipe reactor in fluidic communication with the pump outlet conduit and configured to receive the pump outlet stream and the third acid stream. The pipe reactor is fluidically coupled to: a cationic coagulant feed stream conduit to receive a cationic coagulant feed stream; a first flocculation feed stream conduit to receive a first portion of a flocculation feed stream; and a second flocculation feed stream conduit to receive a second portion of the flocculation feed stream. A pipe reactor outlet stream includes the pump outlet stream, the third portion of the acid feed stream, the cationic coagulant feed stream, the first portion of the flocculation feed stream, and the second portion of the flocculation feed stream. The system further includes a dissolved air flotation unit configured to produce a liquid stream by separating coagulated and/or flocculated materials from the pipe reactor outlet stream.

In certain instances, the first portion of the flocculation feed stream is an anionic flocculant, and the second portion of the flocculation feed stream is a cationic flocculant.

In certain instances, the system further includes a first pH meter configured to measure the pH within the first equalization tank, a second pH meter configured to measure the pH of within the second equalization tank, and a third pH meter configured to measure the pH of the pipe reactor outlet stream.

In certain instances, the dissolved air flotation unit is fluidically coupled to a liquid conduit in which the liquid stream is configured to flow therethrough, the system further including a fourth acid feed stream conduit fluidically coupled to the liquid conduit and configured to deliver a fourth portion of the acid feed stream therein, the system further including a third caustic feed stream conduit fluidically coupled to the liquid conduit and configured to deliver a third portion of a caustic feed stream therein.

In certain instances, the dissolved air flotation unit is fluidically coupled to a solid stream conduit in which sludge is configured to flow therethrough, the system further including a fifth acid feed stream conduit fluidically coupled to the solid stream conduit and configured to deliver a fifth portion of the acid feed stream therein, the system further including a fourth caustic feed stream conduit fluidically coupled to the solid stream conduit and configured to deliver a fourth portion of a caustic feed stream therein.

In certain instances, the system further includes a pH meter configured to measure the pH of the liquid stream, the pH meter positioned downstream of the fifth acid feed stream conduit and the fourth caustic feed stream conduit.

In certain instances, the system further includes a pump fluidically coupled to the solid stream conduit and configured to pump the sludge.

In certain instances, the pH of the contents of the second equalization tank is maintained between 3.9 and 4.3 for an isoelectric state.

BRIEF DESCRIPTION OF THE DRAWINGS

Implementation of the present technology will now be described, by way of example only, with reference to the attached figures, wherein.

It should be understood the various aspects are not limited to the arrangements and instrumentality shown in the drawings.

DETAILED DESCRIPTION OF THE DISCLOSURE

Aspects of the disclosure relate to systems and methods for treating wastewater. More particularly, the disclosure relates to systems and methods for treating wastewater produced in a beverage processing facility. Exemplary beverage processing facilities may produce dairy products, non-dairy products, plant-based beverages (e.g., almond milk, oat milk, soy milk, rice milk), and protein drinks incorporating dairy and/or non-dairy products. Additionally, the beverage processing facilities may produce coffee products, tea products, and juices, among other products. While the disclosure primarily refers to a dairy facility and wastewater associated with a dairy facility, it is understood that the processes described herein are also applicable to other types of beverage processing facilities.

Dairy wastewater refers to water that has been contaminated or polluted during the process of making a dairy product. Other types of beverage facilities produce wastewater as well. In some cases, dairy wastewater refers to water used during the production of a dairy product that is required to be treated before discharge/release according to regulation or governmental authorities. Dairy wastewater generally includes proteins, fats, oils, carbohydrates, water, and sanitation chemicals, among other products. The systems disclosed herein advantageously removes about 75 wt. % or more of the contaminants from the dairy wastewater, based on the total weight of the dairy wastewater.

Figure 1:
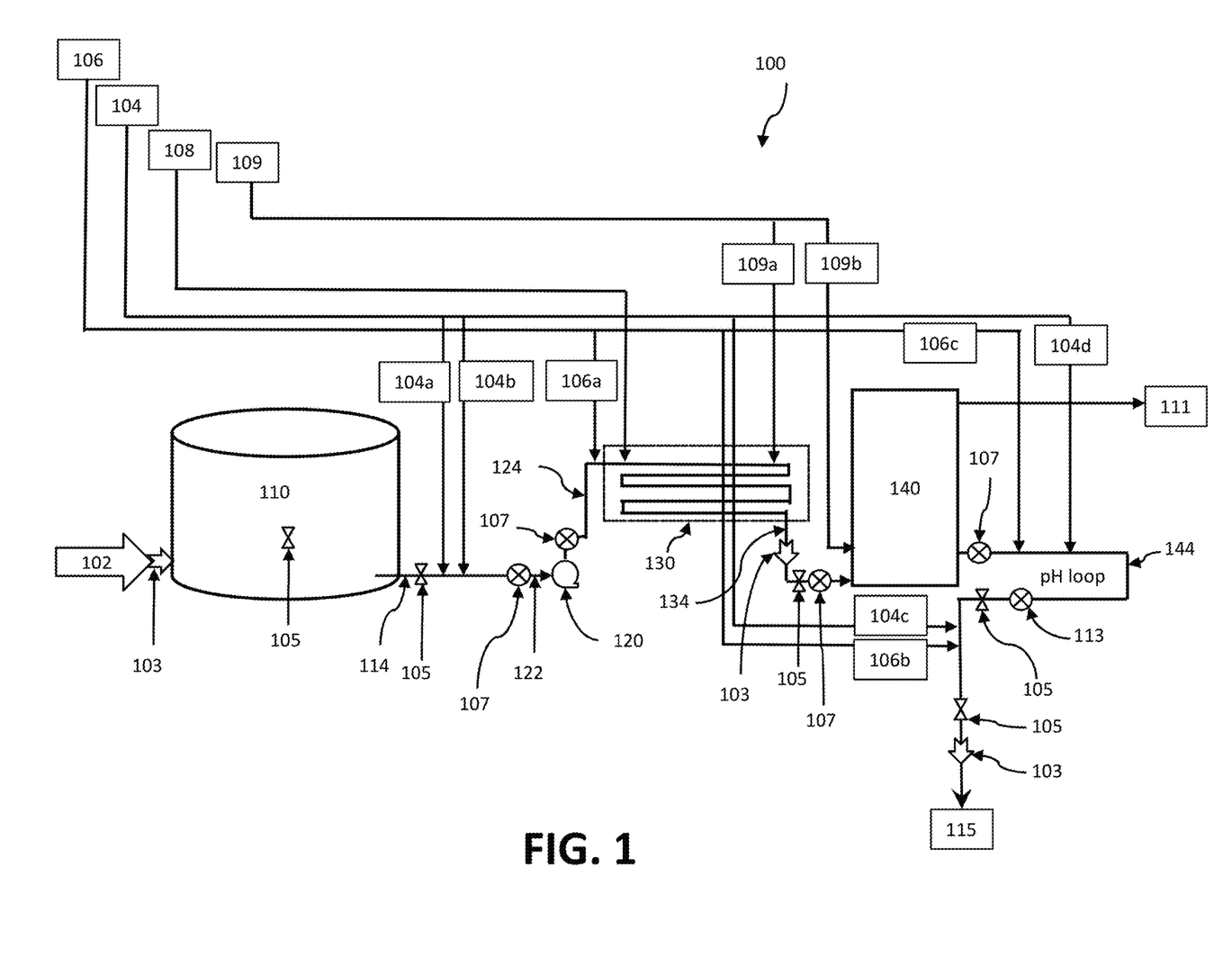
FIG. 1 is a schematic of a non-limiting example of a dairy wastewater treatment system in accordance with aspects of the disclosure.

With reference to FIG. 1, provided is a system 100 for treating dairy wastewater. As a brief overview, system 100 includes a feed stream conduit 102, an equalization tank 110, a pump 120, a pipe reactor 130, and a dissolved air flotation unit 140. Feed stream conduit 102 is configured to receive a dairy wastewater stream. Feed stream conduit 102 may be a pipe, tube, or the like having a thickness and/or structure based on the contents flowing therethrough, the pressure exerted on feed stream conduit 102, and other design parameters. The dairy wastewater stream flowing through the feed stream conduit 102 can have a wide range of PH levels from about 4 to about 10. In certain instances, the pH of the influent dairy wastewater stream is between about 4 and about 5. In certain instances, the pH of the influent dairy wastewater stream is between about 5 and about 6. In certain instances, the pH of the influent dairy wastewater stream is between about 6 and about 7. In certain instances, the pH of the influent dairy wastewater stream is between about 7 and about 8. In certain instances, the pH of the influent dairy wastewater stream is between about 8 and about 9. In certain instances, the pH of the influent dairy wastewater stream is between about 9 and about 10.

System 100 includes an equalization tank 110 in fluidic communication with feed stream conduit 102 and configured to receive the dairy wastewater stream from feed stream conduit 102. A flow meter 103 may be positioned between the feed stream conduit 102 and the equalization tank 110 to measure the incoming flow. Equalization tank 110 may be configured to mix the contents of the dairy wastewater stream. For example, equalization tank 110 may have a stirrer, blades, or the like for mixing the contents in the equalization tank 110. In at least one embodiment, however, the equalization tank 110 is in fluidic communication with a gas (e.g, air) delivery system that forces air through small openings in the bottom of the tank 110 to facilitate mixing of the content of equalization tank 110. In at least one embodiment, however, the equalization tank 110 is configured to rotate and includes flights (sometimes referred to as material lifters) to facilitate mixing of the content of equalization tank 110. The contents of equalization tank 110 may be mixed to produce a homogenous mixture. The equalization tank 110 may include a pH meter (e.g., pH probe) 105 therein to measure the pH of the contents therein. Equalization tank 110 has an outlet port configured to receive an equalization tank outlet stream there through. The pH of the waste stream leaving the equalization tank 110 is conventionally between about 6 and about 8.

An equalization tank outlet conduit 114 may be fluidically coupled to the outlet port of equalization tank 110 and configured to receive the equalization tank outlet stream. Equalization tank outlet conduit 114 may be a pipe, tube, or the like having a thickness and/or structure based on the contents flowing therethrough, the pressure exerted on feed stream conduit 102, and other design parameters. The equalization outlet conduit 114 may be in fluidic connection with a pH meter 105 to measure the pH of the mixture that exited the equalization tank 110.

The system 100 includes a series of conduits in fluid connection with the waste stream that contribute to the treatment of thereof. As seen in FIG. 1, the system includes an acid feed conduit 104, which is configured to deliver an acidic feed stream from an acid feed source into the waste stream. The acid feed conduit 104 is split into various sub-feeds 104a, 104b, 104c, and 104d for distribution at various points along the waste stream. The system 100 also includes a caustic feed stream conduit 106, which is configured to deliver a caustic feed stream from a caustic feed source into the waste stream. The caustic feed conduit 106 is split into various sub-feeds 106a, 106b, and 106c for distribution at various points along the waste stream. The system also includes a cationic coagulant feed stream conduit 108, which is configured to deliver a cationic coagulant stream from a cationic coagulant source into the waste stream. The cationic coagulant feed stream conduit 108 is not split into different sub-feeds in the implementation shown in FIG. 1, but the system 100 could be modified to do so. The system also includes a flocculation feed stream conduit 109 configured to deliver a flocculation feed stream from a flocculation feed source into the waste stream. The flocculation feed stream conduit 109 is split into two sub-feeds 109a and 109b for distribution at different points along the waste stream.

Referring still to FIG. 1, the acid feed stream delivered via the acid feed stream conduit 104 may comprise one or more acids, such as those chosen from sulfuric acid, hydrochloric acid, nitric acid, or a mixture thereof. Any compound that is naturally acidic may be utilized in the acid feed stream. In certain instances, acidic byproducts of the dairy processing such as whey from a cheese making process may be utilized as part of the acid feed source since it is naturally acidic. The acidic feed stream may have a pH of about 1 to about 6.5. In some instances, the pH of acidic feed stream is about 1 to about 6, about 1 to about 5.5, about 1 to about 5, about 1 to about 4.5, about 1 to about 4, about 1 to about 3.5; about 2 to about 6, about 2 to about 5.5, about 2 to about 5, about 2 to about 4.5, about 2 to about 4, about 2 to about 3.5; about 3 to about 6, about 3 to about 5.5, about 3 to about 5, about 3 to about 4.5, about 3 to about 4, or any range or subrange therebetween. In at least one embodiment, the system 100 includes at least two separate acid feed conduits 104a and 104b in fluidic communication with equalization tank outlet conduit 114. Acid feed conduit 104 may be a pipe, tube, or the like having a thickness and/or structure based on the contents flowing therethrough, the pressure exerted on acid feed conduit 104, and other design parameters. In at least one embodiment, acid feed conduit 104 may have a liner with a high corrosion resistance coupled or attached to the inner surface of acid feed conduit 104.

As seen in FIG. 1, the acid feed conduits 104a and 104b are successively introduced into the equalization tank outlet conduit 114. This mixture is passed through a valve (e.g., manual valve) 107 and then is received by a pump inlet conduit 122. In at least one implementation, the pump inlet conduit 122 is configured to receive the acid feed stream from the acid feed conduits 104a and 104b and is configured to receive the equalization tank outlet stream from equalization tank outlet conduit 114. In one embodiment, the acid feed streams 104a and 104b are introduced into pump inlet conduit 122 in an amount that adjusts the contents of equalization tank outlet stream to be in isoelectric state.

The addition of the acid feed stream via the acid feed conduits 104a and 104b is configured to lower the pH of the waste stream to about 4 or about 5. At this pH, the dairy waste stream becomes acidic and naturally begins to coagulate. The coagulation of the dairy waste stream is advantageous because less flocculants are needed in the downstream processes to further separate the liquid and solid materials in the waste stream. In this way, the natural properties of the waste stream are being utilized to accelerate the separating of the solids and liquids by causing the waste stream to curdle via the addition of acid and the lowering of the pH to about 4 or about 5. This all takes place prior to the pipe reactor 130. In other wastewater treatment systems with different types of waste streams, it may not be possible to separate the solids and liquids in this way since curdling is a natural process of a dairy wastewater stream. Thus, the natural process of coagulation is utilized via acid introduction in the system 100 which also includes other components to aid in coagulation and separating of the solids and liquids.

The system 100 includes a pump 120 such as a centrifugal flash pump configured to receive and pump the contents from pump inlet conduit 122. The contents flowing through the pump 120 include the mixture of the waste stream from the equalization tank 110 and the acid feed streams from the acid feed conduits 104a and 104b. The pump 120 is configured to mix the contents of pump inlet conduit 122 (e.g., the acid stream and the equalization tank outlet stream comprising dairy wastewater). Other types of pumps such as positive pumps, diaphragm pumps, twin screw pumps, and the like may be utilized without departing from the teachings of the present disclosure. In some preferred embodiments, the pump 120 homogenously mixes the acid stream and the equalization tank outlet stream and/or promotes an isoelectric state of the pump outlet stream.

A pump outlet stream conduit 124 is fluidically coupled to the pump 120 to receive the pump outlet stream from the pump 120. As seen in FIG. 1, a valve 107 may be positioned at the outlet of the pump 120. Pump outlet stream conduit 124 may be configured to have a cross-sectional area that increases along the downstream direction of flow to allow the suspended solids to collect. For example, pump outlet stream conduit 124 may be configured to have a cross-sectional area with a diameter that increases from 4 inches to 8 inches, continuously or in step-changes, between the pump 120 and the pipe reactor 130. In one implementation, the pump outlet stream 124 received by the pipe reactor 130 has a pH of about 3.9 to about 6.5, about 3.9 to about 6, about 3.9 to about 5.5, about 3.9 to about 5, about 3.9 to about 4.5, about 3.9 to about 4.3, or any range and subrange therebetween. The pump outlet stream conduit 124 may, preferably, be coupled to a pipe reactor 130 to provide the pump outlet stream to pipe reactor 130.

The pump outlet stream conduit 124 may be in fluid communication with the caustic feed stream conduit 106a to receive a caustic feed stream. The caustic feed stream may include one or more caustic compounds from the caustic feed source. In one implementation, caustic feed stream conduit 106a is coupled to the pump outlet stream conduit 124 by way of a T-pipe connection or another pipe coupling. The caustic feed stream general comprises one or more caustic agents, such as those chosen from sodium hydroxide, potassium hydroxide, calcium hydroxide, lithium hydroxide, and a mixture thereof. Other basic substances may be utilized as well. The caustic feed stream may have a pH of about 7.5 to about 13, about 7.5 to about 12, about 7.5 to about 11, about 7.5 to about 10, about 7.5 to about 9, about 7.5 to about 8.5; about 8 to about 13, about 8 to about 12, about 8 to about 11, about 8 to about 10, about 8 to about 9, about 8 to about 8.5; about 8.5 to about 13, about 8.5 to about 12, about 8.5 to about 11, about 8.5 to about 10, about 8.5 to about 9; about 9 to about 13, about 9 to about 12, about 9 to about 11, about 9 to about 10; about 9.5 to about 13, about 9.5 to about 12, about 9.5 to about 11, about 9.5 to about 10; about 10 to about 13, about 10 to about 12, about 10 to about 11, or any ranges or subranges therebetween. System 100 may have a controller, further disclosed below, configured to actuate at least one valve to permit, increase, decrease, or prohibit flow of caustic feed stream to pump outlet stream. For example, the flow of caustic feed stream to pump outlet stream may be based on obtaining a pH of 3.9 or more for a downstream portion of pump outlet stream.

System 100 includes a pipe reactor 130 configured to facilitate acidulation, e.g., of the pump outlet stream 124. The pipe reactor 130 may promote acidulation of the pump outlet stream 124, which comprises the dairy wastewater received by equalization tank 110 with the addition of an acid feed stream and a caustic feed stream. For instance, emulsified oils and milk proteins in the dairy wastewater may, preferably, coagulate and/or aggregate in the pipe reactor 130. As illustrated for the embodiment shown in FIG. 1, the pipe reactor 130 is fluidically coupled to the cationic coagulant feed stream conduit 108. The cationic coagulant feed stream conduit 108 is configured to receive a cationic coagulant stream comprising one or more cationic coagulation agent(s) from a cationic coagulate feed source and provide the cationic coagulant stream to pipe reactor 130. In one implementation, cationic coagulate feed stream conduit 108 is coupled to pipe reactor 130 by way of a T-pipe connection or another pipe coupling. The cationic coagulate feed stream conduit 108 is generally fluidically coupled at the beginning of the pipe reactor 130.

In at least one embodiment, the injection of cationic coagulate feed stream from the conduit 108 into the pump outlet feed stream is promoted by a pump, such as a chemical dosing pump that follows flow curve to ensure a consistent pH value. An example of a suitable cationic coagulation agents contained in cationic coagulant stream may include Coagulant 5051 from Nalco Water, an Ecolab Company. The cationic coagulant feed stream conduit 108 is preferably fluidically coupled to the pipe reactor 130 downstream from the fluidic coupling of the caustic feed stream conduit 106a to the pipe rector 130.

The pipe reactor 130 may be configured such that the coagulation in the stream flowing through the pipe reactor 130 occurs within a distance of about 50% or less from the beginning of the pipe reactor 130, based on the total length of the pipe reactor 130. In some embodiments, coagulation in the stream flowing through pipe reactor 130 occurs within a distance of about 50% or less, about 45% or less, about 40% or less, about 35% or less, or about 30% or less from the beginning of the pipe reactor 130, based on the total length of the pipe reactor 130.

Preferably, the pipe reactor 130 has a length and is configured to have a residence time (also sometimes referred to as detention time) of about 30 seconds to about 120 seconds, about 30 seconds to about 100 seconds, about 30 seconds to about 80 seconds, about 30 seconds to about 70 seconds; about 40 seconds to about 120 seconds, about 40 seconds to about 100 seconds, about 40 seconds to about 80 seconds, about 40 seconds to about 70 seconds; about 50 seconds to about 120 seconds, about 50 seconds to about 100 seconds, about 50 seconds to about 80 seconds, about 50 seconds to about 70 seconds, including any range or subrange therebetween. In at least one embodiment, the residence time is about 60 seconds.

Additionally, or alternatively, the pipe reactor 130 typically has a cross-sectional area that changes along the direction of the flow therethrough. For example, the pipe reactor 130 may have a cross-sectional area with an inner diameter of about 3 inches to about 9 inches or preferably about 4 inches to about 8 inches. In one implementation, the pipe reactor 130 is configured to have three sections with different cross-sectional areas, such as a first section with a cross-sectional area having an inner diameter of 8 inches, a second section with a cross-sectional area having an inner diameter of 6 inches, and a third section with a cross-sectional area having an inner diameter of 4 inches.

In some embodiments, the cationic coagulate feed stream conduit 108 may be fluidically coupled to pipe reactor 130 such that injection of the cationic coagulate feed stream occurs in the section of pipe reactor 130 having a cross-sectional area with an inner diameter of eight inches. Pipe reactor 130 may have a diameter that reaches an inner diameter of eight inches within a distance of about 30%, about 25%, about 20%, about 15%, about 10%, or about 5% from the beginning of pipe reactor 130 based on the total length of pipe reactor 130. In one embodiment, the cationic coagulate feed stream is injected as a solution, under pressure from a pump (e.g. recycle water pump) pushing at ten gallons a minute. Preferably, the injection of the cationic coagulate feed stream promotes saturation of the total cross section of the flow through pipe reactor 130, providing an inoculation of cationic coagulant uniform throughout the stream flowing through pipe reactor 130.

As seen in FIG. 1, a flocculation feed stream conduit 109a is configured to deliver a flocculation feed stream to the waste stream flowing through the pipe reactor 130. The flocculation feed stream generally includes one or more anionic or cationic flocculation agents. An example of a suitable flocculation agent includes Dry Polymer OPTIMER™ 9901 from Nalco Water, an Ecolab Company. In one implementation, flocculation feed stream conduit 109 is coupled to the pipe reactor 130 by way of a T-pipe connection or another pipe coupling. The flocculation feed stream is injected using a pipe quill into the center of reactor pipe 130, at a point with limited turbulence to discourage particle shear. The flocculation feed stream may be fed by a pump, such as a chemical dosing pump, that follows flow curve to ensure a consistent injection of flocculation agents. As seen in FIG. 1, the flocculation feed stream conduit 109a is coupled to the pipe reactor 130 downstream of the cationic coagulate feed stream conduit 108.

The flocculation feed stream conduit 109a is fluidically coupled to the pipe reactor 130 and configured to provide flocculation feed stream to the waste stream flowing through the pipe reactor 130. Preferably, the flocculation feed stream conduit 109 is fluidically coupled to pipe reactor 130 at a distance of about 50% or less, about 40% or less, about 30% or less, about 25% or less, about 20% or less, about 15% or less, about 10% or less, or about 5% or less from the end of pipe reactor 130 based on the total length of pipe reactor 130. In some embodiments, however, flocculation feed stream conduit 109a is fluidically coupled to a pipe reactor outlet stream conduit 134.

The pipe reactor outlet stream conduit 134 is fluidically coupled to the pipe reactor 130 and configured to receive the pipe reactor outlet stream from the pipe reactor 130. The pipe reactor outlet stream conduit 134 may be in fluidic communication with a dissolved air flotation unit 140. The pipe reactor outlet stream conduit 134 may pass through a flow meter 103, a pH meter 105, and a valve 107 prior to the dissolved air flotation unit 140.

The dissolved air flotation unit 140 is configured to produce a liquid stream by separating coagulated and/or flocculated materials from the pipe reactor outlet stream. Preferably, dissolved air flotation unit 140 is a horizontally arranged dissolved air flotation unit. The separated coagulated and/or flocculated materials (sometimes referred to as sludge) may be removed and sent to sludge storage tanks or the like 111. The coagulated and/or flocculated materials in sludge storage tanks may be maintained at a low pH and decanted before solids handling take place. The remaining liquid after removal of the coagulated and/or flocculated materials may include the dissolved air flotation outlet stream that is configured to flow through the dissolved air flotation outlet stream conduit 144.

A dissolved air flotation outlet stream conduit 144 is typically in fluid communication with dissolved air flotation unit 140 and configured to receive the dissolved air flotation outlet stream. Preferably, dissolved air flotation outlet stream conduit 144 is in fluidic communication with and configured to receive an acidic feed stream from an acid feed stream conduit (e.g., acid feed stream conduits 104c and 104d) and a caustic feed stream from a caustic feed stream conduit 106 (e.g., caustic feed stream conduit 106b and 106c). The system 100 may be configured such that the acidic feed stream from conduit 104d and/or the caustic feed stream from conduit 106c is added to the dissolved air flotation outlet stream just after a valve 107. The waste stream continues in a pH loop and passes through an air actuated valve 113 and then to a PH meter 105. Based on the pH reading from the pH meter 105, a final addition of the acid feed stream and/or the caustic feed stream into the waste stream are possible via a connection to the acid feed stream conduit 104c and the caustic feed stream conduit 106b. Downstream of the acid feed stream conduit 104c and the caustic feed stream conduit 106b is a final pH meter 105 to measure the outflowing pH through the system 100 and a final flow meter 103. The outflowing stream may be in fluidic connection with the publicly owned treatment works 115.

As described herein, the system 100 includes one or more sensors, e.g., for sensing characteristics of the content/fluid flowing through the components of the system 100, such as the equalization tank 110, the pump 120, the pipe reactor 130, the dissolved air flotation unit 140, and/or any of the conduits disclosed herein. Preferably, the system 100 has one or more pH meters or probes. For example, system 100 may include a first pH meter that senses the pH in the equalization tank 110. The system 100 may also include a second pH meter that senses the pH in the equalization tank outlet stream 114. From the reading of the pH in the equalization tank outlet stream, an amount of acid can be added to the waste stream via the acid feed conduits 104a, 104b. A third pH meter may be positioned after the pipe reactor 130 and before the dissolved air flotation unit 140. A fourth pH meter may be positioned downstream of the dissolved air flotation unit 140 and after the introduction of the caustic feed stream conduit 106c and acid feed stream conduit 104d. And a fifth pH meter may be positioned downstream of the fourth pH meter and subsequent to a final acid feed stream conduit 104c and caustic feed stream conduit 106b to provide a final pH level of the stream that is sent to the publicly owned treatment works 115. The positioning of the pH meters throughout the system enables accurate adjustment of the pH at multiple points within the system to enable an effective control loop.

System 100 may include a controller configured to receive data from one or more sensors. The controller may be configured to actuate one or more valves to permit, increase, decrease, or prohibit flow through a conduit and/or component of system 100. For example, the controller of the system 100 may actuate a valve and/or a pump (e.g., chemical dosing pumps) to introduce an amount of acidic feed stream and/or caustic feed stream to pump outlet stream to obtain a desired pH for the pump outlet stream received by pipe reactor 130. Additionally or alternatively, controller 100 may actuate a valve and/or a pump (e.g., chemical dosing pumps) to introduce an amount of acidic feed stream and/or caustic feed stream to dissolved air flotation outlet stream to obtain a desired pH for the dissolved air flotation outlet stream.

Valves, such as one-way valves, may be included in system 100 to facilitate or prohibit flow through one or more conduits. Additionally, or alternatively, the valve may be configured to facilitate flow direction. In one example, a one-way valve may be in fluid communication with a conduit and configured to permit fluid to flow therethrough in solely one direction. For example, a one-way valve may be coupled to a pump outlet stream conduit 124 and configured to prohibit pump outlet stream from flowing from the one-way valve to the pump 120.

Advantageously, the system 100 may remove about 50 wt. % or more of the contaminants from the dairy wastewater.

For example, system 100 may remove about 60 wt. % or more, about 70% or more, about 75 wt. % or more, about 80 wt. % or more, about 85 wt. % or more, about 90 wt. % or more, about 95 wt. % or more, about 96 wt. % or more, about 97 wt. % or more, about 98 wt. % or more, or about 99 wt. % or more, based on the total weight of the dairy wastewater.

Figure 2:
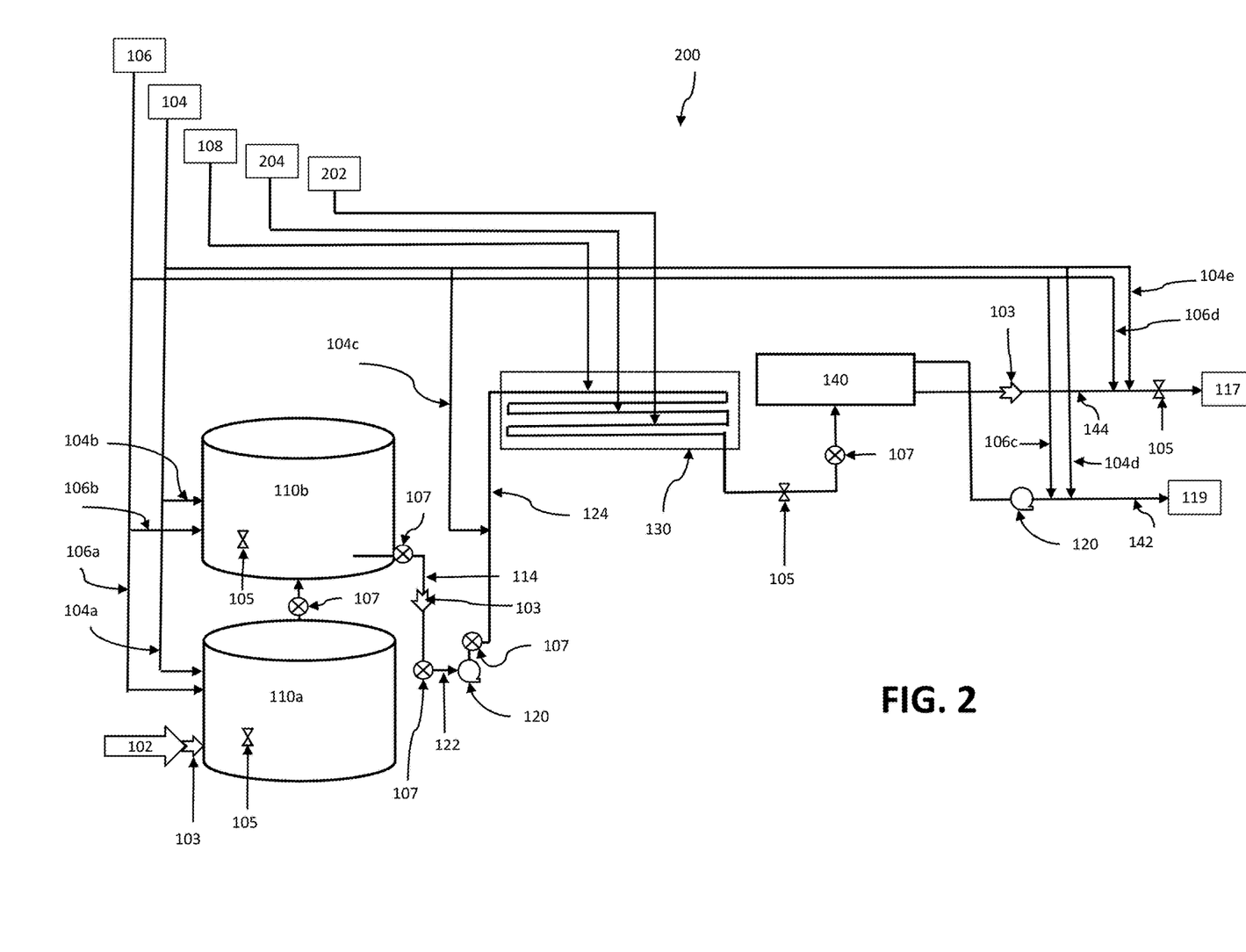
FIG. 2 is a schematic of another non-limiting example of a dairy wastewater treatment system according to aspects of the disclosure.

With reference to FIG. 2, provided is a system 200 for treating dairy wastewater. System 200 is similar to system 100, except that system 200 includes a first equalization tank 110a, a second equalization tank 110b, and different fluidic connections of the conduits. Accordingly, where system 200 utilizes components that are similar to those of system 100, similar reference numerals are applied. Although similar reference numerals are utilized, various aspects of the features of system 200, e.g., size, material, etc. may be different from those described with respect to systems 100.

As a brief overview, the system 200 includes a first equalization tank 110a, a second equalization tank 110b, a pump 120, a pipe reactor 130, and a dissolved air flotation unit 140. The system 200 includes a series of conduits in fluidic connection with the components of the system 200 for introducing acids, caustic agents, cationic coagulants, anionic flocculants, and cationic flocculants therein to treat the waste stream. These agents are delivered through various conduits, which are labeled as caustic feed stream conduit 106, acid feed stream conduit 104, cationic coagulant feed stream conduit 108, anionic flocculant feed stream conduit 204, and cationic flocculant feed stream conduit 202. As seen in FIG. 2, there are various sub-stream conduits (labeled as a, b, c, etc.) that split up or partition the feed streams for distribution at various points along the waste stream.

As illustrated in FIG. 2, the first equalization tank 110a includes a first pH meter 105 for measuring a level of pH in the tank 110a. The tank 110a is in fluidic connection with a first acid feed conduit 104a to receive a first acid feed stream, a first caustic feed stream 106a to receive a first caustic feed stream, and a feed stream conduit 102 to receive a dairy waste water stream. The dairy wastewater stream flowing through the feed stream conduit 102 can have a wide range of pH levels from about 4 to about 10. In certain instances, the pH of the influent dairy wastewater stream is between about 4 and about 5. In certain instances, the pH of the influent dairy wastewater stream is between about 5 and about 6. In certain instances, the pH of the influent dairy wastewater stream is between about 6 and about 7. In certain instances, the pH of the influent dairy wastewater stream is between about 7 and about 8. In certain instances, the pH of the influent dairy wastewater stream is between about 8 and about 9. In certain instances, the pH of the influent dairy wastewater stream is between about 9 and about 10.

The first equalization tank 110a is also in fluid communication with a second equalization tank 110b, which also includes a second pH meter 105 for measuring a level of pH in the tank 110b. The second equalization tank 110b is in fluidic connection with a second acid feed conduit 104b to receive a second acid stream and a second caustic feed stream 106b to receive a second caustic feed stream. The first acid stream and the second acid stream, in some embodiments, may be the same. In at least one embodiment, however, the first acid stream has a great volumetric rate and/or a greater concentration of acid than the second acid stream. Additionally, or alternatively, the first caustic feed stream and the second caustic feed stream may be the same.

The second equalization tank 110b is fluidically coupled to a tank outlet conduit 114 that couples to a valve 107 followed by a flow meter 103 and then another valve 107.

The pH of the waste stream leaving the second equalization tank 110b is conventionally between about 6 and about 8. From the valve 107, the conduit forms a pump inlet conduit 122 leading to a pump 120, which pumps the waste stream through a valve 107 and to the reaction pipe 130.

Prior to the reaction pipe 130, a third acid feed conduit 104c fluidically couples to the pump outstream conduit 124 to treat the waste stream and adjust the pH content therein. The addition of the acid feed stream via the third acid feed conduits 104c is configured to lower the pH of the waste stream to about 4 or about 5. At this pH, the dairy waste stream becomes acidic and naturally begins to coagulate. The coagulation of the dairy waste stream is advantageous because less flocculants are needed in the downstream processes to further separate the liquid and solid materials in the waste stream. In this way, the natural properties of the waste stream are being utilized to accelerate the separating of the solids and liquids by causing the waste stream to curdle via the addition of acid and the lowering of the pH to about 4 or about 5. This all takes place prior to the pipe reactor 130. In other wastewater treatment systems with different types of waste streams, it may not be possible to separate the solids and liquids in this way since curdling is a natural process of a dairy wastewater stream. Thus, the natural process of coagulation is utilized via acid introduction in the system 100 which also includes other components to aid in coagulation and separating of the solids and liquids.

As seen in FIG. 2, a cationic coagulate feed stream conduit 108, a cationic flocculation feed stream conduit 202 and an anionic flocculation feed stream conduit 204 are coupled to the pipe reactor 130 by way of a T-pipe connection or another pipe coupling. These connections are downstream of the third acid feed conduit 104c. At the reaction pipe 130, the anionic and/or cationic flocculation feed streams may inject using pipe quills into the center of reactor pipe 130, at a point with limited turbulence to discourage particle shear. The anionic and/or cationic flocculation feed streams may be fed by pumps, such as chemical dosing pumps, that follows flow curve to ensure a consistent injection of flocculation agents.

The cationic flocculation feed stream may comprise one or more cationic flocculation agents and mixtures thereof. The anionic flocculation feed stream may comprise one or more anionic flocculation agents and mixtures thereof.

Cationic flocculation feed stream conduit 202 and anionic flocculation feed stream conduit 204 may be in fluidic communication with pipe reactor 130 to provide cationic flocculation feed stream and anionic flocculation feed stream to pipe reactor 130. Preferably, cationic flocculation conduit 202 is fluidically coupled to pipe reactor 130 downstream from anionic flocculation conduit 204. In at least one instance, cationic flocculation feed stream conduit 202 is fluidically coupled to pipe reactor 130 at a distance of about 40% or less, about 30% or less, about 25% or less, about 20% or less, about 15% or less, about 10% or less, or about 5% or less from the end of pipe reactor 130, based on the total length of pipe reactor 130. Additionally, or alternatively, anionic flocculation feed stream conduit 204 is fluidically coupled to pipe reactor 130 at a distance of about 70% to about 30% or about 70% to about 30% from the end of pipe reactor 130 based on the total length of pipe reactor 130.

Downstream of the reaction pipe 130 is a third pH meter 105, a valve 107, and then the dissolved air flotation unit 140. The dissolved air flotation unit 140 is configured to produce a liquid stream by separating coagulated and/or flocculated materials from the pipe reactor outlet stream 144.

Preferably, dissolved air flotation unit 140 is a horizontally arranged dissolved air flotation unit. The separated coagulated and/or flocculated materials (sometimes referred to as sludge) may be removed and sent to sludge storage tanks 117. The coagulated and/or flocculated materials in sludge storage tanks 117 may be maintained at a low pH and decanted before solids handling take place. In certain instances, the sludge may be sent to a moving bed biofilm reactor. The solid stream in the solid stream conduit 142 exiting the dissolved air flotation unit 140 may be pumped downstream via a pump 120. The solid stream 142 is in fluidic communication with and configured to receive an acidic feed stream from an acid feed stream conduit 104d and a caustic feed stream from a caustic feed stream conduit 106c. The solid waste stream in the conduit 142 may be sent to a biological treatment process 119 for further treatment of dissolved solids.

The remaining liquid in the dissolved air flotation unit 140, after removal of the coagulated and/or flocculated materials, exits through the dissolved air flotation outlet stream conduit 144. The dissolved air flotation outlet stream conduit 144 passes the waste stream through a flow meter 103 after exiting the dissolved air flotation unit 140. The outlet stream conduit 144 from the unit 140 is in fluidic communication with and configured to receive an acidic feed stream from an acid feed stream conduit 104e and a caustic feed stream from a caustic feed stream conduit 106d to adjust the pH of the waste stream therein. Downstream of the acid feed stream conduit 104c and the caustic feed stream conduit 106d is a fourth pH meter 105 configured to measure the pH of the outgoing stream in the conduit 144 prior to the sludge storage tanks 117.

It should be understood from the foregoing that, while embodiments have been illustrated and described, various modifications can be made thereto without departing from the spirit and scope of the invention as will be apparent to those skilled in the art. Such changes and modifications are within the scope and teachings of this invention as defined in the claims appended thereto.

The terms "comprising," "having," and "including" are used in their open, non-limiting sense. The terms "a" and "the" are understood to encompass the plural as well as the singular. The compositions and methods of the present disclosure can comprise, consist of, or consist essentially of the essential elements and limitations of the disclosure described herein, as well as any additional or optional ingredients, components, or limitations described herein or otherwise useful.

All percentages, parts and ratios herein are based upon the total weight of the compositions of the present disclosure, unless otherwise indicated. All ranges and values disclosed herein are inclusive and combinable. The expression "inclusive" for a range of concentrations means that the limits of the range are included in the defined interval. For examples, any value or point described herein that falls within a range described herein can serve as a minimum or maximum value to derive a sub-range, etc. Furthermore, all ranges provided are meant to include every specific range within, and combination of sub ranges between, the given ranges. Thus, a range from 1-5, includes specifically 1, 2, 3, 4 and 5, as well as sub ranges such as 2-5, 3-5, 2-3, 2-4, 1-4, etc.

Other than in the operating examples, or where otherwise indicated, all numbers expressing quantities of ingredients and/or reaction conditions are to be understood as being modified in all instances by the term "about," meaning within +/−5% of the indicated number.

As used herein, the expression "at least one" is interchangeable with the expression "one or more" and thus includes individual components as well as mixtures/combinations.

Throughout the disclosure, the term "a mixture thereof" or "a combination thereof" may be used following a list of elements as shown in the following example where letters A-F represent the elements: "one or more elements selected from the group consisting of A, B, C, D, E, F, and a mixture thereof." The term, "a mixture thereof" or "a combination thereof" does not require that the mixture include all of A, B, C, D, E, and F (although all of A, B, C, D, E, and F may be included). Rather, it indicates that a mixture and/or a combination of any two or more of A, B, C, D, E, and F can be included. For example, it is equivalent to the phrase "one or more elements selected from the group consisting of A, B, C, D, E, F, and a mixture of any two or more of A, B, C, D, E, and F."

All components and elements positively set forth in this disclosure can be negatively excluded from the claims. In other words, the systems or methods of the instant disclosure can be free or essentially free of all components, features, elements, and more method steps positively recited throughout the instant disclosure.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements, and methods which, although not explicitly shown or described herein, embody the principles of the invention and are thus within the spirit and scope of the present invention. From the above description and drawings, it will be understood by those of ordinary skill in the art that the embodiments shown and described are for purposes of illustrations only and are not intended to limit the scope of the present invention. References to details of embodiments are not intended to limit the scope of the invention.

What is claimed is:

1. A method of treating dairy wastewater comprising:
   receiving a dairy wastewater stream at a first pH from a dairy processing facility at an equalization tank;
   receiving the dairy wastewater stream from the equalization tank at a pump in fluidic communication with the equalization tank;
   based on at least one of the first pH or a second pH of the dairy wastewater stream upon exiting the equalization tank, receiving an acid to the dairy wastewater stream prior to the pump, wherein a pump outlet stream comprises a mixture of the dairy wastewater stream and the acid at a third pH that is lower than the first pH;
   receiving the pump outlet stream at a pipe reactor in fluidic communication with the pump;
   receiving a cationic coagulant feed stream at the pipe reactor;
   receiving a flocculation feed stream at the pipe reactor, wherein a pipe reactor outlet stream comprises the pump outlet stream, the cationic coagulant feed stream, and the flocculation feed stream;
   receiving the pipe reactor outlet stream at a dissolved air flotation (DAF) unit; and
   outputting a liquid stream at a final pH from the DAF unit.

2. The method of claim 1, wherein the third pH is sufficiently low to cause the mixture of the dairy wastewater stream and the acid to curdle.

3. The method of claim 2, wherein the third pH is within a range of PH levels from about 4 to about 5.

4. The method of claim 1, wherein the acid is an acidic byproduct of the dairy processing facility.

5. The method of claim 1, wherein a controller controls the receiving of the acid to the dairy wastewater stream based on at least one of the first pH or the second pH of the dairy wastewater stream upon exiting the equalization tank.

6. The method of claim 1, wherein the acid is received to the dairy wastewater stream after exiting the equalization tank.

7. The method of claim 1, wherein the pump outlet stream is received at the pipe reactor with a pH level within a range of about 3.9 to about 6.5.

8. The method of claim 1, wherein the first pH of the dairy wastewater stream is within a range of pH levels from about 4 to about 10.

9. The method of claim 1, further comprising: producing a dairy product and dairy wastewater at the dairy processing facility, the dairy wastewater comprising contaminated water resulting from producing the dairy product, the dairy wastewater stream comprising the dairy wastewater.

10. The method of claim 1, wherein the acid has a pH level within a range of about 1 to about 6.5.

11. A method of treating dairy wastewater comprising:
receiving a dairy wastewater stream at a first pH from a dairy processing facility at a first equalization tank;
receiving a first portion of an acid feed stream into the first equalization tank;
receiving a first portion of a caustic feed stream into the first equalization tank;
receiving, at a second equalization tank fluidically coupled to the first equalization tank, a first equalization tank outlet stream comprising the dairy wastewater stream, the first portion of the acid feed stream, and the first portion of the caustic feed stream;
receiving a second portion of the acid feed stream at the second equalization tank;
receiving a second portion of the caustic feed stream at the second equalization tank;
receiving, at a pump in fluidic communication with the second equalization tank, a second equalization tank outlet stream at a second pH, the second equalization tank outlet stream comprising the first equalization tank outlet stream, the second portion of the acid feed stream, and the second portion of the caustic feed stream;
receiving, at a pump outlet stream comprising the second equalization tank outlet steam, a third portion of the acid feed stream therein to form a mixture with a third pH that is less than the first pH;
receiving the pump outlet stream and the third portion of the acid feed stream at a pipe reactor;
receiving a cationic coagulant feed stream at the pipe reactor;
receiving a flocculation feed stream at the pipe reactor, wherein a pipe reactor outlet stream comprises the pump outlet stream, the third portion of the acid feed stream; the cationic coagulant feed stream, and the flocculation feed stream;
receiving the pipe reactor outlet stream at a dissolved air flotation (DAF) unit; and
outputting a liquid stream at a final pH from the DAF unit.

12. The method of claim 11, further comprising: maintaining the third pH sufficiently low to cause the mixture of the dairy wastewater stream and the acid to curdle.

13. The method of claim 12, wherein the third pH is within a range of pH levels from about 4 to about 5.

14. The method of claim 11, wherein the acid feed stream is an acidic byproduct of the dairy processing facility.

15. The method of claim 11, wherein the pump outlet stream and the third portion of the acid feed stream is received at the pipe reactor with a pH level within a range of about 3.9 to about 6.5.

16. The method of claim 11, wherein the first pH of the dairy wastewater stream is within a range of pH levels from about 4 to about 10.

17. The method of claim 11, further comprising maintaining a pH level of contents of the second equalization tank within a range of about 3.9 to about 4.3 for an isoelectric state receiving.

18. The method of claim 11, wherein the dairy processing facility produces dairy products, and the dairy wastewater stream comprises contaminated water resulting from production of the dairy products.

19. The method of claim 11, wherein the acid feed stream has a pH level within a range of about 1 to about 6.5.

20. The method of claim 11, further comprising: producing a dairy product and dairy wastewater at the dairy processing facility, the dairy wastewater comprising contaminated water resulting from producing the dairy product, the dairy wastewater stream comprising the dairy wastewater.

* * * * *